United States Patent
Desai et al.

(10) Patent No.: US 9,834,105 B2
(45) Date of Patent: Dec. 5, 2017

(54) APPARATUS, SYSTEM AND METHOD FOR IN-VEHICLE WIRELESS CHARGING

(71) Applicant: MOTOROLA SOLUTIONS, INC, Schaumburg, IL (US)

(72) Inventors: Dipti V. Desai, Lawenceville, GA (US); Daniel J. Jakl, Dacula, GA (US); William B. Kiger, Hoschton, GA (US); Edmond Louie, Snellville, GA (US); Francesca Schuler, Palatine, IL (US); Cheah Heng Tan, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 147 days.

(21) Appl. No.: 14/942,904

(22) Filed: Nov. 16, 2015

(65) Prior Publication Data

US 2017/0136886 A1 May 18, 2017

(51) Int. Cl.
*H02J 7/00* (2006.01)
*H02J 7/02* (2016.01)
*B60L 11/18* (2006.01)

(52) U.S. Cl.
CPC .......... *B60L 11/182* (2013.01); *H02J 7/0052* (2013.01); *H02J 7/025* (2013.01)

(58) Field of Classification Search
CPC ........ B60L 11/182; H02J 7/0052; H02J 7/025
USPC ....................................................... 320/108
See application file for complete search history.

(56) References Cited

U.S. PATENT DOCUMENTS

| | | | |
|---|---|---|---|
| 2013/0249482 A1* | 9/2013 | Iwanaga et al. ...... | H01M 10/46 320/108 |
| 2015/0380970 A1* | 12/2015 | Vu et al. ................. | H02J 7/025 320/108 |
| 2016/0301236 A1* | 10/2016 | Krishnamurthi et al. ....................... | H02J 7/025 |

FOREIGN PATENT DOCUMENTS

WO  2015077198 A2  5/2015

OTHER PUBLICATIONS

Krishnamurthi et al—U.S. Appl. No. 14/685,203, filed Apr. 13, 2015.

* cited by examiner

*Primary Examiner* — Sun Lin
(74) *Attorney, Agent, or Firm* — Barbara R. Doutre

(57) ABSTRACT

An apparatus, system and method for wirelessly charging are provided within a vehicular environment. The wireless charging system comprises a seatbelt receptacle containing a transmit coil integrated therein for transmitting a charging signal to a battery or powering a battery operated device. A repeater coil can be wirelessly coupled to the transmit coil via the seatbelt's buckle, as a buckle repeater coil or a retrofit cover repeater coil. Additional repeater coils may be added to a shoulder strap, a lap strap, or other portions of the seat belt harness for additional charging points. The additional repeater coils are slideable to adjust for different body sizes. One or more portable devices having receive coils can be charged or powered wirelessly from the transmit coil in the seatbelt receptacle, the repeater coil of the seatbelt buckle or cover, and/or the additional adjustable strap repeater coils.

20 Claims, 6 Drawing Sheets

APPARATUS, SYSTEM AND METHOD FOR IN-VEHICLE WIRELESS CHARGING

FIELD OF THE INVENTION

The present invention relates generally to wireless charging and more particularly to wireless charging of portable electronic devices in a vehicular environment.

BACKGROUND

Portable battery-powered devices are advantageous in many environments, but particularly in public safety environments such as law enforcement, fire rescue, and first responder environments. A wide variety of portable battery-powered devices utilized by public safety personnel are worn on or about the body, for example portable radios, mobile phones, tasers, remote speaker microphones, and tracking devices, sensors to name a few. Public safety personnel often utilize a vehicle while carrying and even operating some of these portable battery-powered devices, and as such the ability to charge the devices in an unobtrusive manner without having to remove the device is highly desirable.

Providing charging capability within the limited confines of a vehicle is challenging, particularly when dealing with a plurality of devices worn on or about the body. Additionally, most public safety personnel still need the freedom to access and operate the battery-powered device while the device is being charged.

Accordingly, there is a need for an improved approach to in-vehicle charging of battery-powered devices.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
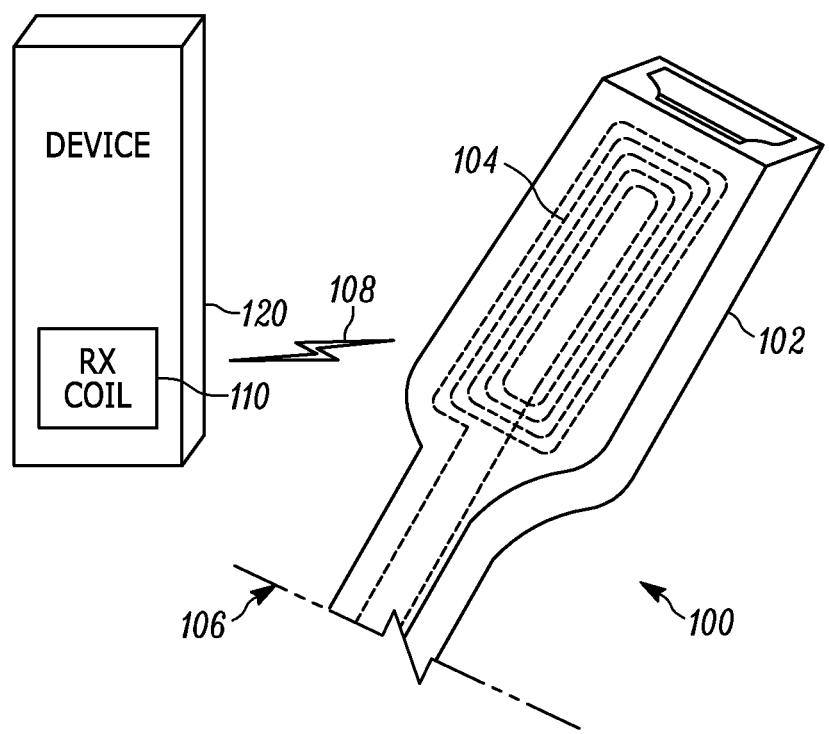
FIG. 1 is a wireless charger formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly there is provided herein an apparatus, system and method for wirelessly charging within a vehicular environment. The wireless charger comprises a seatbelt receptacle containing a transmitter coil integrated therein for transmitting a signal to wirelessly charge a battery or power a battery operated device. A repeater coil may further be provided to wirelessly couple to the transmitter coil via the seatbelt's buckle, as a buckle repeater coil or a retrofit cover repeater coil. Additional repeater coils may be added to a shoulder strap, a lap strap, or other portions of the seat belt harness for additional charging access points. The additional repeater coils can be slideable along the straps to provide user-adjustability to accommodate for devices being worn at different locations on different body sizes. One or more portable electronic devices having receive coils can be charged or powered wirelessly from the transmit coil in the seatbelt receptacle, buckle repeater coil or a retrofit cover repeater coil, and/or the user-adjustable strap repeater coils. Thus, body worn-device can be advantageously charged or powered while being worn in a vehicular environment without having to remove the device.

FIG. 1 is a wireless charger 100 formed and operating in accordance with some embodiments. The wireless charger 100 comprises a seatbelt receptacle 102 and a transmit coil 104 integrated within the seatbelt receptacle. The seatbelt receptacle 102 is located within a vehicle 106 which provides a power source (shown later) to the transmit coil. The transmit coil is provided integrated with the seatbelt receptacle for generating a wireless charging signal 108 for charging a portable electronic device 120 having a receive coil 110 and/or for acting as a source coil for subsequent repeater coils of an expanded charger system to be described in subsequent embodiments. The transmit coil 104 may be generally planar and sized to fit within the diameter and length of the seatbelt receptacle 102, whether deposited by laser deposition on the seatbelt receptacle 102, applied adhesively as a flexible circuit adhered to the seatbelt receptacle 102 or integrated within the inside of the seatbelt receptacle 102 itself. The size of the transmit coil depends on a variety of factors including, but not limited to, seatbelt receptacle form factor, the amount of power transfer required, efficiency, and the size of the coil of the device to be charged.

The transmit coil 104 transmits power wirelessly to a receive coil 110 of a portable electronic device 120 for charging or powering the device. The portable electronic device 120 may be located by the seatbelt receptacle 102, such as a radio worn by the user's side or located in the vicinity of the seatbelt receptacle is now capable of being charged or powered directly by the transmit coil 104. The portable electronic device 120 may be, for example, a radio, a GPS navigation device, a taser, a gun holder or taser holder with sensors, a smart phone, a tablet, or a battery pack (independent of the device it powers) that may be worn on or about the seatbelt receptacle 102.

Transmit coil 104 can be configured to accommodate different types of wireless power transfer, such as magnetic resonance coupling, inductive coupling, For example, if wireless magnetic resonance coupling is desired then the transmit coil 104 of the seatbelt receptacle 102 and the receive coil 110 of the portable electronic device 120 can be loosely coupled. If inductive power transfer is desired, the transmit coil 104 and receive coil 110 may be more tightly coupled. Vehicle 106 supplies the power and charge circuitry in accordance with the appropriate type of coupling. Coils may be generally planar and have diameters and distances between them designed for the appropriate coupling.

Figure 2:
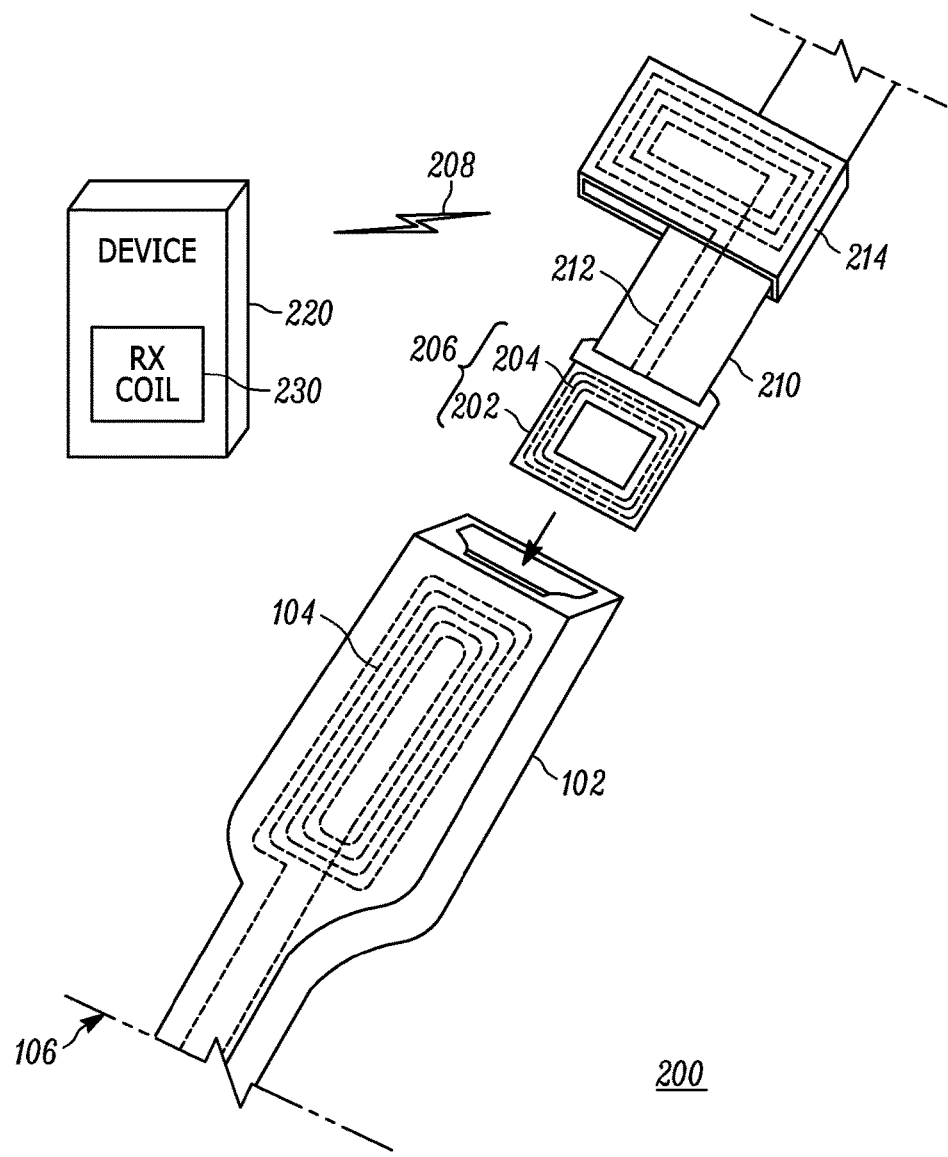
FIG. 2 is a wireless charger formed and operating in accordance with some embodiments.

FIG. 2 is a wireless charger 200 formed and operating in accordance with some embodiments. The wireless charger 200 further comprises one or more seatbelt straps 210 having a seatbelt buckle 202 coupled thereto. In accordance with some of the embodiments, the seatbelt buckle 202 comprises a repeater coil 204 disposed thereon to form buckle repeater coil 206. The repeater coil 204 may be integrated to the metal buckle via an adhesive flex circuit substrate, metalized paint, etched metal coil lasered within the buckle, or other suitable integration or coil deposition process. The one or more seatbelt straps 210 may comprise one or more of: a lap strap and a shoulder strap or other vehicular restraint harness.

The seatbelt receptacle 102 having transmit coil 104 integrated therein is configured to receive the seatbelt buckle 202 having the repeater coil 204 disposed thereon or integrated therein to align with the transmit coil 104. The repeater coil 204 on seatbelt buckle 202 does not interfere with the buckling or unbuckling of the seatbelt and is thus a seamless alignment operation from the user perspective.

The wireless charger 200 further comprises one or more additional repeater coil(s) 214 wired 212 to the buckle repeater coil 206, which will be referred to as strap repeater coils 214. The additional strap repeater coils 214 are slideably adjustable along the one or more seatbelt straps 210 of the seatbelt providing user adjustable access points for charging. A user can now slide the charging access points (the strap repeaters coils 214) to provide wireless charging access points that align with different body worn devices. The wired coupling 212 may be retractable to the slideable repeater coil 214 to facilitate length adjustment, if desired.

In operation, the transmit coil 104 wirelessly transmits power to the buckle repeater coil 206. The buckle repeater coil 206 transfers power to the one or more additional strap repeater coils 214 aligned with electronic devices to be charged 220, and each strap repeater coil 214 wirelessly 208 charges or powers the device 220 via its respective receive device coil 230. For example, strap repeater coil 214 can be slideably adjusted to the shoulder for charging or powering a shoulder worn remote speaker microphone. By slideably adjusting a plurality of strap repeater coils to desirable access points on a lap strap, a shoulder strap and/or other locations on a vehicular restraint harness a wide variety of chargeable devices 220 can be accommodated for example, a radio, remote speaker microphone, a GPS navigation device, a taser, a smart phone, a gun holder sensor, a tablet, or a battery pack (independent of the device it powers). The user no longer needs to remove the body worn device to charge or power the device while in the vehicle. The plurality of strap repeater coils may further be selectively powered ON or OFF, via an intelligent control and radio communication system, such as a dispatch system or other radio network communication system.

Figure 3:
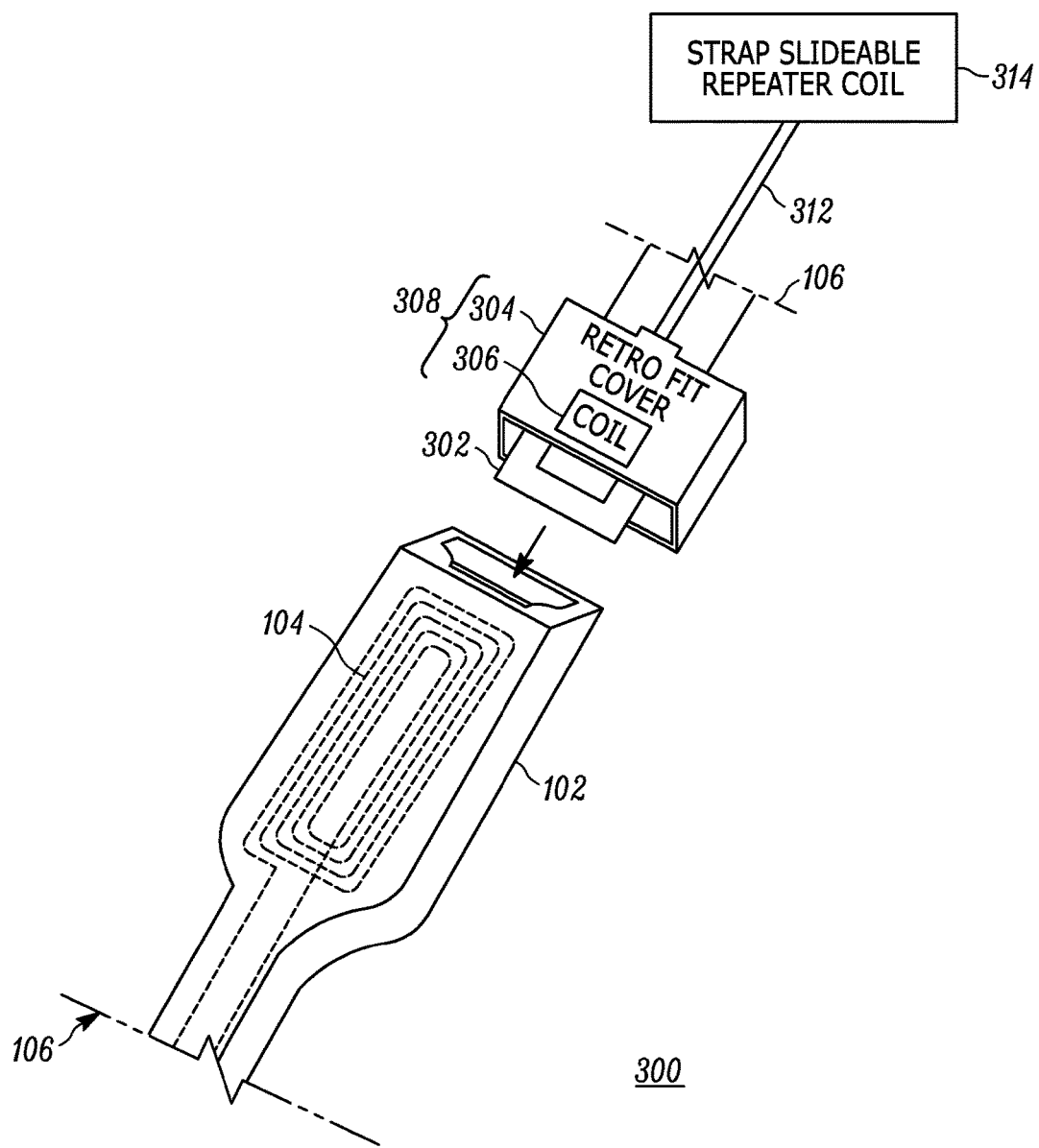
FIG. 3 is a wireless charger formed and operating in accordance with some embodiments.

FIG. 3 is a block diagram of a wireless charger 300 formed and operating in accordance with some embodiments. In this embodiment, a retrofit cover 304 having a repeater coil 306 integrated therein or disposed thereon provides a retrofit cover repeater coil 308. The retrofit cover repeater coil 308 may be formed of a housing having openings at either end so as to easily slide over at least a portion of the seatbelt buckle 302 or seatbelt receptacle 102. Upon insertion of the seatbelt buckle 302 into the seatbelt receptacle 102, the retrofit cover repeater coil 308 slides over the seatbelt buckle 302 thereby aligning the cover's repeater coil 306 with the transmit coil 104 of the seatbelt receptacle 102. Alternatively, the retrofit cover repeater coil 308 may be formed of an open backed type housing which clips directly over the seatbelt receptacle 102 and transmit coil 104. Hence, the transmit coil 104 and the repeater coil 306 of the cover 308 can wirelessly couple.

Charger 300 further comprises the addition of strap repeater coils 314 being wired to the retrofit cover repeater coil 308 via wired coupling 312. The strap repeater coil(s) 314 can be slid and secured on the seatbelt strap 310 hook-and-loop fastening connector or fastener, for example a VELCRO fastener, clips or other attachment means. The wired coupling 312 may be retractable to the slideable repeater coil 314 to facilitate length adjustment. The slideable adjustable strap repeater coils 314 may further be removable and attachable at other locations along the seatbelt strap 310. The strap 310 may be embodied as a lap strap and/or a shoulder strap. In accordance with some embodiments, the slideable adjustable strap repeater coil 314 may be attached to the strap, slid along the strap to adjust position, used for charging a device, and removed and/or readjusted for other charging other devices.

The use of retrofit cover repeater coil 308 provides for increased design flexibility in terms of coil selection and size and may be made of such materials of flex circuit, printed circuit board (PCB) assembly, planar Litz wire coil mounted on plastic or PCB, to name a few, which readily permit for integration and/or deposition of planar coil depositions and allow for wires to be connected to subsequent repeater coil 314.

Depending on which strap or straps are being used (lap and/or shoulder straps) the chargeable device may be, for example, a radio, a remote speaker microphone, a smart phone, a GPS navigation device, a tablet, or a battery pack (independent of the device it powers). Electronic devices worn at the belt, waist or side pocket are well suited to lap strap chargers while devices worn at the front shoulder, top shoulder, or breast pocket are well suited to shoulder strap chargers. The placement can be adjusted along the straps (lap and/or shoulder) in accordance with where the electronic device to be charged is being worn.

Figure 4:
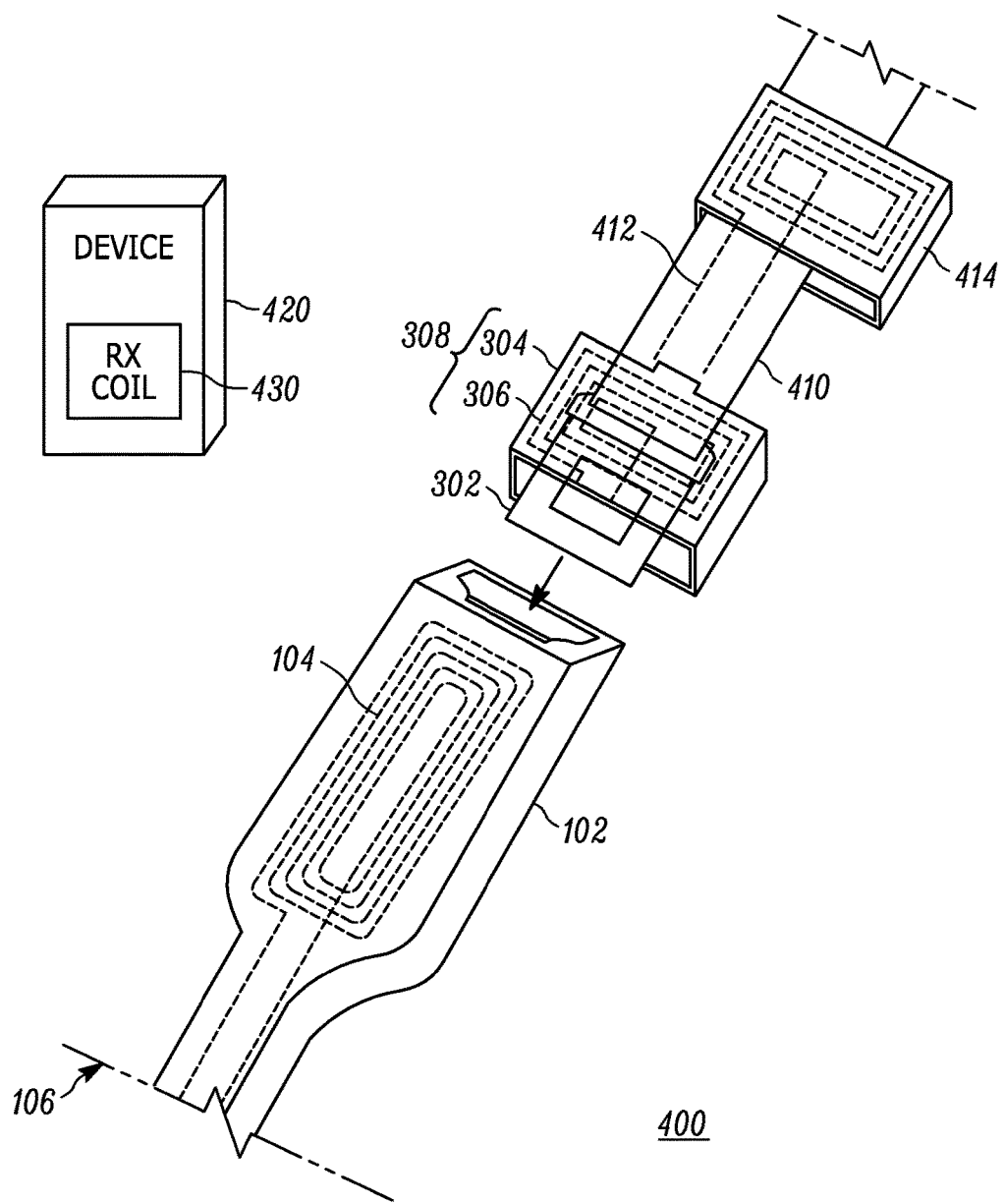
FIG. 4 is a wireless charger formed and operating in accordance with some embodiments.

FIG. 4 is a wireless charger 400 formed and operating in accordance with some embodiments. This embodiment is an example of the embodiment of to that of FIG. 3 showing the addition of strap repeater coils 414 being wired to the retrofit cover repeater coil 308 via wired coupling 412. The strap repeater coil(s) 414 can be slid and secured on the seatbelt strap 410 using hook-and-loop fastening connector or fastener, for example a VELCRO fastener, or clips. The wired coupling 412 may be retractable to the slideable repeater coil 414 to facilitate length adjustment. The slideable adjustable strap repeater coils 414 may further be removable and attachable at other locations on the seatbelt straps 410. The additional wired repeater coils 414 can be slideable along the seatbelt straps 410 to provide user-adjustability to accommodate for devices being worn at different locations on different body sizes. For example, shoulder worn devices will vary for people of different statures short, medium tall. Location of side hip or waist worn radios will vary from person to person. The slideably adjustable strap repeater coils 414 allow for alignment of charger access points with one or more body-worn devices 420 having receive coils 430. User selectable location charging locations along the straps allows the user can continue to access the device in a normal manner while the device is being charged or powered.

The body-worn devices 420 may be, for example, a radio, a remote speaker microphone, a smart phone, a GPS navigation device, a tablet, or a battery pack (independent of the device it powers).

Figure 5:
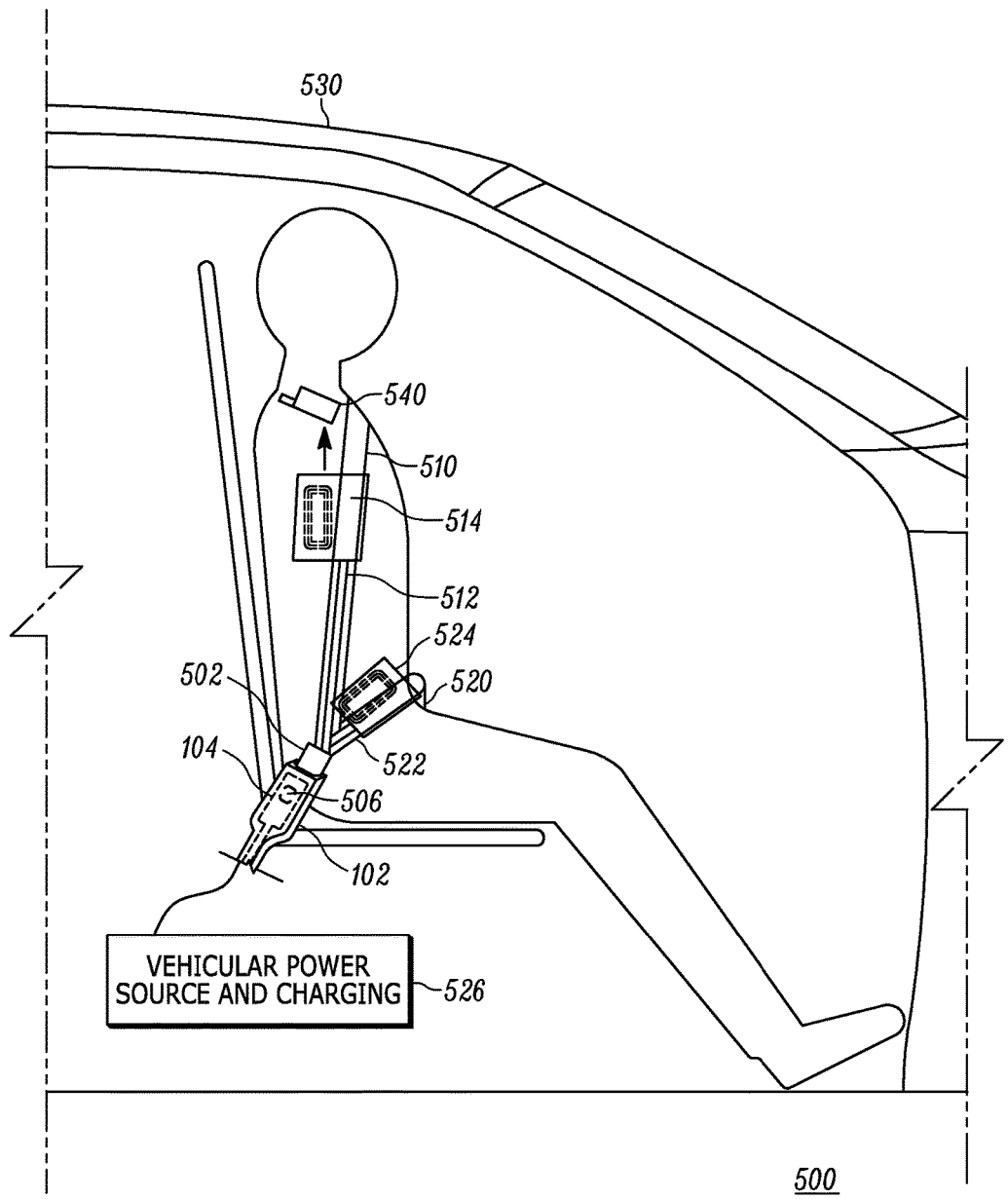
FIG. 5 illustrates a charging system within a motor vehicle formed and operating in accordance with some of the embodiments.

FIG. 5 illustrates a charging system 500 within a motor vehicle 530 formed and operating in accordance with some of the embodiments. The transmit coil 104 is integrated within the seatbelt receptacle. The vehicle provides a power source and charging circuitry 526 for activating the transmit coil 104. A first repeater coil 506 is provided to wirelessly couple to the transmit coil 104 via the seatbelt buckle 502 as either a buckle repeater coil or a retrofit buckle cover as previously described. The metal buckle portion of the seatbelt is not shown but is inserted within the receptacle 102. Thus, transmit coil 104 and first repeater coil 506 are aligned for wireless coupling. In this embodiment, the transmit coil 104 and first repeater coil 506 are overlapped for wireless coupling.

Additional repeater coils 514 and 524 have been added to a shoulder strap 510 and a lap strap 520, both being respectively wired 512, 522 back to the first repeater coil 506 associated with the seatbelt buckle 502. Other portions of the seat belt harness may also be used as additional charging access points. The additional strap repeater coils 514, 524 are slideable along the straps to provide user-adjustability to accommodate for devices being worn at different locations on different body sizes.

One or more devices having receive coils can be charged or powered wirelessly from the transmit coil in the seatbelt receptacle, the repeater coil of the seatbelt buckle or cover, and/or the repeater coils associated with the seatbelt straps. For example strap repeater coil 514 can be slid along strap 510 to align with electronic device 540, such as a remote speaker microphone having a receive coil for powering or charging. Thus, body worn-devices can be advantageously charged or powered while being worn in a vehicular environment without having to move the device. Chargeable devices may comprise, body-worn devices such as a radio worn at the waist, a remote speaker microphone worn at the belt, a smart phone in a pocket, a GPS navigation device, a tablet, or a battery pack (independent of the device it powers) to name a few.

Figure 6:
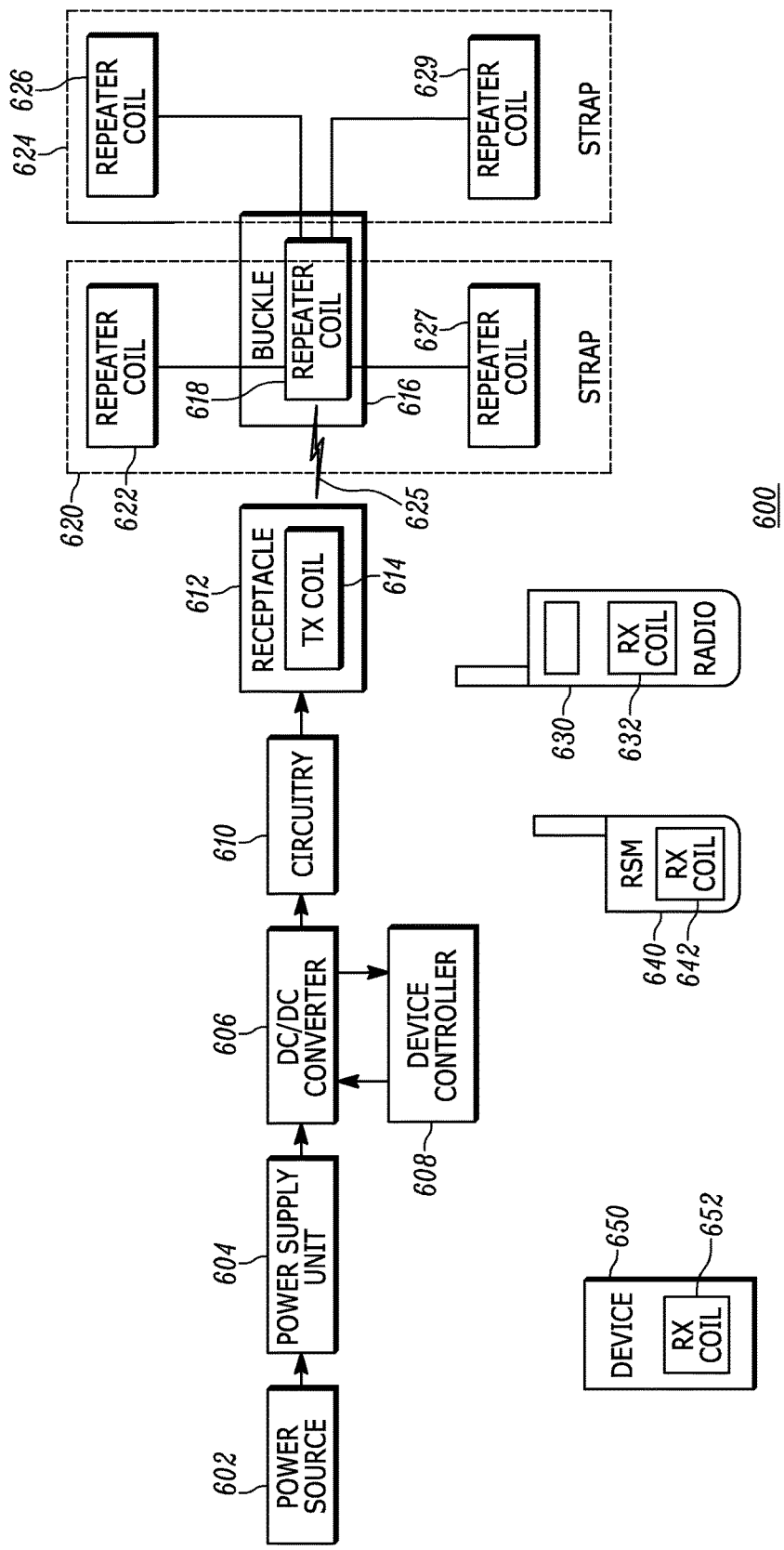
FIG. 6 is a block diagram of a charging system formed and operating in accordance with some of the embodiments.

FIG. 6 is a block diagram of an in-vehicle charging system 600 formed and operating in accordance with some of the embodiments. The charging system 600 may be embodied in different implementations, but is shown to generally comprise a power source 602, a power supply unit 604, a DC/DC converter 606, a microcontroller 608, and charger circuitry 610. In accordance with the various embodiments, the charging system 600 electrically couples to a transmit coil 614 coupled to a seatbelt receptacle 612 and the transmit coil 614 can then charge or power a receive coil of an electronic device, such as receive coil 632 or radio 630.

A brief operative description of the in-vehicle charging system 600 is provided although those skilled in the art will appreciate that the charging components and circuitry used to excite the transmit coil 102 can be modified to suit power demands for the devices to be charged. The power source 602 may be a power supply on-board the vehicle for example a typical 12 volt (V) vehicle battery or other appropriate on board supply. The power source 602 outputs direct current (DC) power to the power supply unit 604. The power supply unit 604 receives and filters the input DC power and outputs filtered DC power to the DC/DC supply.

The DC/DC supply converts the filtered DC power input to one or more different voltage levels for output to the microcontroller 608. The microcontroller 608 is powered by the output of the DC/DC converter 606, which may be, for example, 3.3 V or 5 V. The microcontroller 608 also provides control signals to the DC/DC converter 606 to control the DC/DC conversion. Charger circuitry 610 may include power amplifiers, rectifiers, filters and components selected for efficiency, matching coupling distances, and for driving the transmit coil 614 and the generation of a wireless signal xxx 625. For example, the charger circuitry 610 may be designed to have coil 614 generate a wireless signal 625 comprising magnetic resonance signal, or inductive signal, appropriate wireless charging signal for coupling with the receive coil 632 of the portable electronic device 630. The electronic device 630 and receive coil 632 appropriately couple to converters and controller circuitry for charging and or powering using known, or yet to be developed approaches.

In accordance with another embodiment, the charging system 600 may further comprise a plurality of repeater coils such as those previously described. For example, a first repeater coil 618 is shown associated with a seatbelt buckle 616, which may be embodied as the buckle repeater coil 206 of FIG. 2 or the retrofit cover repeater coil 308 of FIG. 3. The transmit coil 614 can wireless couple to the first repeater coil 618 associated with the seatbelt buckle 616, and the first repeater coil 618 can then wireless couple to a receive coil 632 for wirelessly charging a battery or powering the electronic device 630.

In accordance with a further embodiment, additional sliding repeater coils 622, 627, 624, 629 located on one or more seatbelt straps 620, 624 can be can be wired to the first repeater coil 618, also known as the buckle repeater coil 618. While each of the additional sliding repeater coils 622, 627, 624, 629 is shown having its own respective wired coupling to the buckle repeater coil 618, the repeater coils of each strap may alternatively be coupled in series. Hence, the strap repeater coils can be either connected individually to the buckle repeater coil or daisy chained to the buckle repeater coil.

The slideable strap repeater coils 622, 627, 624, 629 are user-adjustable for locating the repeater coil in proximate alignment with body worn devices to be charged. For example, the slideable repeater coil 622 can be sideably adjusted along a shoulder strap of the seatbelt to charge or power a shoulder worn remote speaker microphone. As another example, slideable repeater coil 626 can be adjusted on the lap strap 624 of the seatbelt for charging another portable electronic device 650 having a receive coil 652, for example a GPS device worn on the lap.

Accordingly, in-vehicle charging system 600 provides for the wireless transfer of power to one or more chargeable device(s) 630, 640 via the transmit coil 614 of the seatbelt receptacle 612, the buckle repeater coil 618 of seatbelt buckle 616 and/or the slideable strap repeater coils 622, 626 of seatbelt straps 620, 624.

Accordingly, there has been provided a wireless charger within a vehicular environment. The wireless charger comprises a seatbelt receptacle containing a transmitter coil integrated therein for transmitting a signal to wirelessly charge a battery or power a battery operated device. The charger can be expanded into a larger charger system through the addition of a repeater coil associated with a buckle of the seatbelt to wirelessly couple to the transmitter coil via a buckle repeater coil 206 or a retrofit cover repeater coil 308. Additional repeater coils may be added to a shoulder strap, a lap strap, or other portions of the seat belt harness for additional charging access points. The additional repeater coils can be slideable along the straps to provide user-adjustability to accommodate for devices being worn at different locations on different body sizes. One or more portable electronic devices having receive coils can be charged or powered wirelessly from the transmit coil 104 in the seatbelt receptacle 102, as a buckle repeater coil 206 or a retrofit cover repeater coil 308, and/or the user-adjustable strap repeater coils. Thus, one or more body-worn portable electronic device can be advantageously charged or powered while being worn in a vehicular environment without having to remove the device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A wireless charger, comprising:
a seatbelt receptacle of a seatbelt; and
a transmit coil integrated within the seatbelt receptacle.

2. The wireless charger of claim 1, wherein the seatbelt receptacle is located within a vehicle and the vehicle provides a power source to the transmit coil.

3. The wireless charger of claim 1, wherein the transmit coil generates a wireless charging signal.

4. The wireless charger of claim 1, wherein the seatbelt receptacle is configured to receive a seatbelt buckle having a repeater coil disposed thereon forming a buckle repeater coil for aligning with the transmit coil.

5. The wireless charger of claim 4, wherein the seatbelt buckle is coupled to a strap having a repeater coil coupled thereto forming a strap repeater coil, the strap repeater coil being coupled to the buckle repeater coil.

6. The wireless charger of claim 5, wherein the strap comprises one or more of: a lap strap and a shoulder strap.

7. The wireless charger of claim 5, wherein the repeater coil is slideable along the strap.

8. The wireless charger of claim 5, wherein the strap repeater coil charges a battery or powers a battery operated device.

9. The wireless charger of claim 1, wherein the seatbelt receptacle is configured to receive a seatbelt buckle and the seatbelt buckle further comprises:
a retrofit cover having a repeater coil integrated therein providing a retrofit cover repeater coil, the retrofit cover repeater coil configured to slideably couple over a portion of the seatbelt receptacle upon insertion of the seatbelt buckle into the seatbelt receptacle thereby aligning the retrofit cover repeater coil with the transmit coil of the seatbelt receptacle.

10. The wireless charger of claim 9, wherein the transmit coil of the seatbelt receptacle and the retrofit cover repeater coil wirelessly couple.

11. The wireless charger of claim 1, further comprising:
a plurality of repeater coils coupled to a strap of the seatbelt, wherein a first repeater coil of the plurality of repeater coils comprises a buckle repeater coil for wirelessly coupling to the transmit coil, and wherein additional repeater coils of the plurality of repeater coils comprise strap repeater coils wired to the buckle repeater coil for transferring charging power from the buckle repeater coil across the strap.

12. The wireless charger of claim 11, wherein the strap repeater coils are slideably adjustable along the strap.

13. The wireless charger of claim 1, further comprising:
a buckle repeater coil operating as a charging coil that is wirelessly coupled to the transmit coil, and wherein the transmit coil is wired to a power source and charge circuitry of the vehicle.

14. A method for charging a portable electronic device having a receive coil, the method comprising:
coupling a transmit coil to a seatbelt receptacle of a seatbelt; and
wirelessly coupling the receive coil of portable electronic device with the transmit coil; and
charging the portable electronic device via the transmit coil.

15. The method of claim 14, further comprising:
inserting a seatbelt buckle having a buckle repeater coil disposed thereon into the seatbelt receptacle; and
the buckle repeater coil aligning with the transmit coil.

16. The method of claim 15, further comprising:
attaching an additional repeater coil to a strap of the seatbelt forming a strap repeater coil, the strap repeater coil being wired to the buckle repeater coil; and
charging another portable electronic device using the strap repeater coil.

17. The method of claim 16, further comprising:
adjusting a location of the strap repeater coil along the strap of the seatbelt.

18. The method of claim 17, further comprising:
removing the strap repeater coil from the strap; and
relocating the strap repeater coil elsewhere on another strap of the seatbelt.

19. An in-vehicle wireless charger system, comprising:
a seatbelt;
a seatbelt receptacle;
a transmit coil integrated with the seatbelt receptacle;
a seatbelt buckle for coupling to the seatbelt receptacle;
a repeater coil coupled to the seatbelt buckle, the repeater coil for wirelessly coupling to the transmit coil in response to the seatbelt buckle being inserted into the seatbelt receptacle; and
a slideable repeater coil coupled to a strap of the seatbelt, the slideable repeater coil electrically coupling to the repeater coil of the seatbelt buckle.

20. The in-vehicle wireless charger system of claim 19, wherein at least one of the transmit coil integrated with the seatbelt receptacle, the repeater coil coupled to the seatbelt buckle, and the slideable repeater coil coupled to the strap charges one or more body-worn electronic devices having receive coils.

* * * * *